United States Patent [19]

Thomson et al.

[11] Patent Number: 5,655,139

[45] Date of Patent: Aug. 5, 1997

[54] EXECUTION UNIT ARCHITECTURE TO SUPPORT X86 INSTRUCTION SET AND X86 SEGMENTED ADDRESSING

[75] Inventors: Thomas William Schaw Thomson, Santa Cruz; HonKai John Tam; Alexander Perez, both of Sunnyvale; Mario Nemirovsky, San Jose, all of Calif.

[73] Assignee: National Semiconductor Corporation, Santa Clara, Calif.

[21] Appl. No.: 451,924

[22] Filed: May 26, 1995

[51] Int. Cl.[6] .................................................. G06F 9/00
[52] U.S. Cl. ........................... 395/800.32; 395/421.1; 364/730.01; 364/232.8; 364/255.5; 364/258; 364/DIG. 1
[58] Field of Search .............................. 395/800, 842, 395/401–405, 454, 480, 484, 497.04, 410, 412, 417, 421.02, 421.03, 421.04, 421.09, 421.1; 365/230.01, 230.04; 364/736, 746

[56] References Cited

U.S. PATENT DOCUMENTS

| | | | |
|---|---|---|---|
| 3,461,433 | 8/1969 | Emerson | 340/172.5 |
| 3,949,378 | 4/1976 | Crabb et al. | 395/421.1 |
| 5,031,135 | 7/1991 | Chandravadan Patel et al. | 364/745 |
| 5,189,319 | 2/1993 | Fung et al. | 307/452 |
| 5,204,953 | 4/1993 | Dixit | 395/400 |
| 5,249,148 | 9/1993 | Cathernood et al. | 364/746 |
| 5,254,888 | 10/1993 | Lee et al. | 307/480 |
| 5,259,006 | 11/1993 | Price et al. | 375/107 |
| 5,293,592 | 3/1994 | Fu et al. | 395/375 |
| 5,335,333 | 8/1994 | Hinton et al. | 395/417 |
| 5,381,537 | 1/1995 | Baum et al. | 395/416 |
| 5,404,473 | 4/1995 | Papworth et al. | 395/375 |
| 5,408,626 | 4/1995 | Dixit | 395/421.1 |
| 5,511,017 | 4/1996 | Cohen et al. | 364/746 |
| 5,590,297 | 12/1996 | Huck et al. | 395/401 |

FOREIGN PATENT DOCUMENTS 0047439  3/1982  European Pat. Off. .

OTHER PUBLICATIONS

IBM Technical Disclosure Bulletin, vol. 35, #2, 1 Jul. 1992, pp. 284–285, "Four-Bit Multiply Step Using Effective Address Unit".

Serra, Micaela & Dervisoglu, Bulent I, "Testing", Chapter 79, *The Electrical Engineering Handbook*, Richard C. Dorf, Editor–in–Chief, pp. 1808–1837, CRC Press.

L-T Wang et al., "Feedback Shift Registers For Self–Testing Circuits", *VLSI Systems Design*, Dec. 1986.

Masakazu Shoji, "CMOS Dynamic Gates", Chapter 5, *AT&T CMOS Digital Circuit Technology*, Prentice Hall, 1988, pp. 210–257.

Guthrie, Charles, "Power–On Sequencing For Liquid Crystal Displays; Why, When, And How", *Sharp Application Notes*, Sharp Corporation, 1994, pp. 2–1 thru 2–9.

Bernd Moeschen, "NS32SP160—Feature Communication Controller Architecture Specification", *National Semiconductor*, Rev. 1.0, May 13, 1993.

Agarwal, Rakesh F., *80×86 Architecture and Programming, vol. II: Architecture Reference*, Chapter 4, Prentice Hall, 1991, pp. 542–543.

Intel486 Microprocessor Family Programmer's Reference Manual, Intel Corporation, 1993.

"8327A High Performance Prgrammable DMA Controller (8237A, 8237A–4, 8237A–5)", *Periphral Components*, Intel, 1992, pp. 3–14 thru 3–50.

Kane, Gerry, "R2000 Processor Programming Model", Chapter 2, *MIPS RISC Architecture*, MIPS Computer Systems, Inc.

(List continued on next page.)

Primary Examiner—Alpesh M. Shah
Attorney, Agent, or Firm—Limbach & Limbach, L.L.P.

[57] ABSTRACT

A microprocessor execution unit includes an arithmetic unit and an addressing unit. The arithmetic unit performs arithmetic and logical operations on operands. The addressing unit operates in conjunction with the arithmetic unit to calculate offsets, limits, and linear addresses in a single cycle.

1 Claim, 5 Drawing Sheets

OTHER PUBLICATIONS

Hennessy, John, et al., "Interpreting Memory Addresses", *Computer Architecture A Quantitative Approach*, pp. 95–97, Morgan Kaufmann Publishers, Inc. 1990.

*PowerPC601 Reference Manual*, IBM, 1994, Chapter 9, "System Interface Operation", pp. 9–15 thru 9–17.

Intel Corp. Microsoft Corp., *Advanced Power Management (APM) BIOS Interface Specification*, Revision 1.1, Sep. 1993.

Intel Corporation, *i486 Micro Processor Hardware Reference Manual*, Processor Bus, pp. 3–28 thru 3–32.

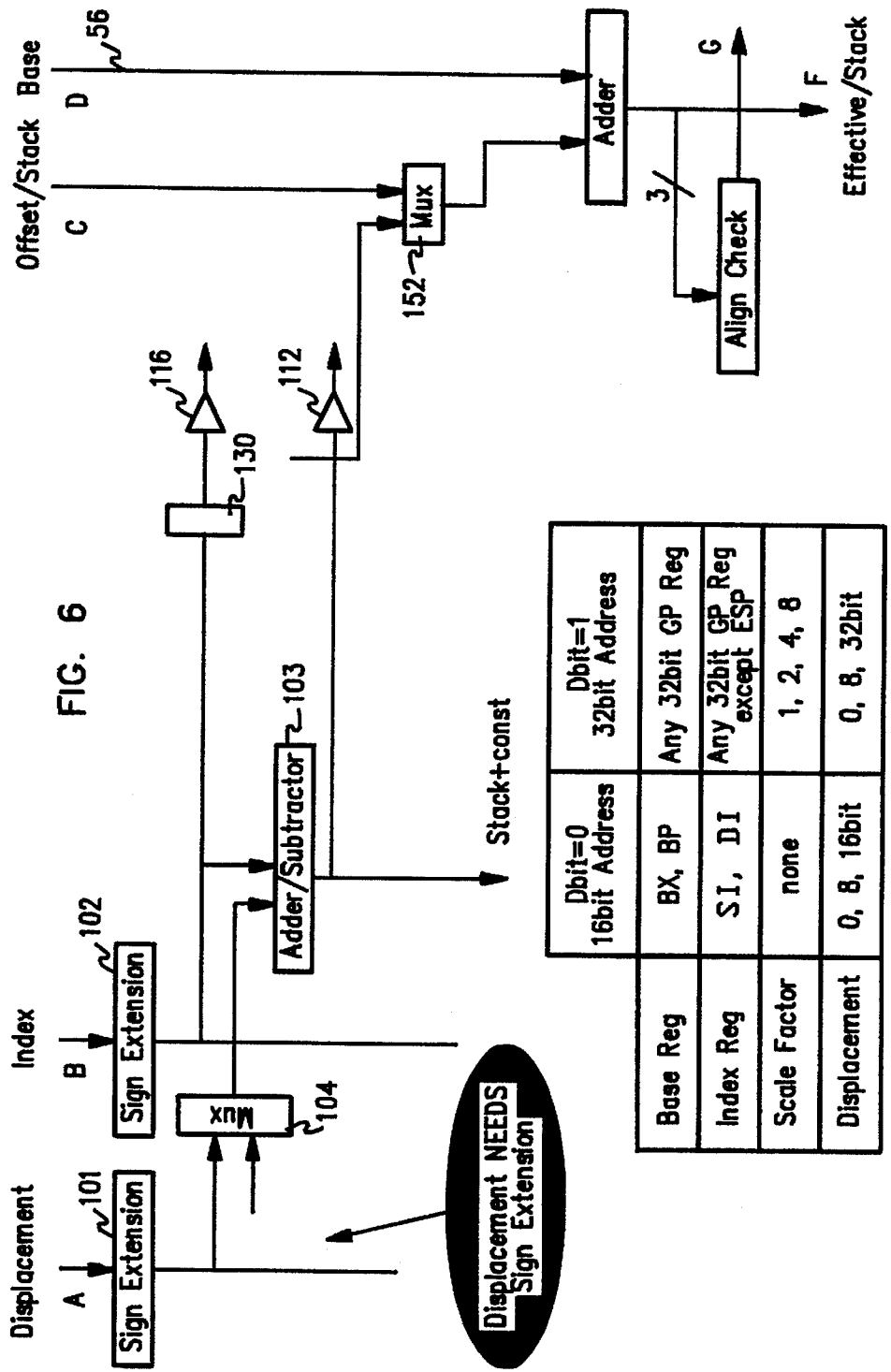

5,655,139

1

EXECUTION UNIT ARCHITECTURE TO SUPPORT X86 INSTRUCTION SET AND X86 SEGMENTED ADDRESSING

BACKGROUND OF THE INVENTION

The present invention relates generally to microprocessor architecture, and more particularly to the architecture of a microprocessor execution unit which performs arithmetic and logic operations concurrently with address computations.

Many modern microprocessors have a "pipelined architecture" whereby the processor is divided into stages. This permits the processor to perform several tasks at once thereby allowing the processor to work on different parts of the instructions simultaneously as they are advanced through the pipe with each clock cycle. Under ideal conditions, one instruction can leave the pipeline and another instruction enter the pipeline every clock cycle. One such microprocessor is the Intel486™ microprocessor. Compatible x86-type microprocessors include those made by Advanced Micro Devices and Cyrix.

Arising out of the need for compatibility with older Intel microprocessor designs and the fact that it is a general purpose microprocessor, the x86 microprocessor has a complex instruction set architecture which includes over 400 instructions. However, some of these instructions are rarely used by either the operating system or the compiler. Thus, it would be desirable to optimize the architecture for commonly used instructions.

As described in Chapter 2 of the "Intel486™ MICROPROCESSOR FAMILY PROGRAMMER'S REFERENCE MANUAL," the memory of an x86-type microprocessor is organized as a sequence of 8-bit bytes and each byte is assigned a unique physical address. However, application programs do not directly address the physical address, but instead use a virtual addressing scheme whereby the physical address is calculated based on a memory management model that includes segmentation and paging.

The physical memory is divided into independent memory spaces called segments. Each segment has a segment descriptor which contains its base address and a size limit for that segment. An application program issues a logical address which the addressing hardware translates into a linear address by adding an offset to the segment base address, so long as the offset does not exceed the size limit. The offset is the sum of three components, namely, a displacement value, a base register and an index register.

Paging is also supported by x86-type architecture, whereby linear address space, which may be part of physical memory or disk storage, is divided into 4k blocks of memory called pages. If paging is employed, addressing hardware translates the linear address into a physical address. If not, the linear address is the same as the physical address.

Thus, x86-type addressing hardware must handle the worst case scenario, namely, wherein the effective address is the sum of the base and all offset components. However, in many applications, only one offset component is present. Therefore, it would also be desirable to optimize the addressing hardware to handle the usual rather than the worst case addressing computation.

SUMMARY OF THE INVENTION

An architecture for a microprocessor execution unit is disclosed. The architecture is generally described as having an arithmetic unit and an addressing unit. The arithmetic unit

2 performs arithmetic and logical operations on a pair of operands in response to control signals. The addressing unit operates in conjunction with the arithmetic unit to calculate linear addresses as well as offsets and limits.

The arithmetic unit includes a first portion for performing addition, subtraction and logical operations, a second portion for performing multiply, divide and single-bit shift operations, and a third portion for performing multi-bit shift and rotate operations.

The addressing unit is coupled to the output of the arithmetic unit. When an addressing instruction is received, the addressing unit calculates the segment base and the arithmetic unit calculates the offset. The results are summed in a single cycle to yield a linear address.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

FIG. 6 is a block diagram of a portion of the execution unit of FIG. 3.

DETAILED DESCRIPTION OF THE INVENTION

Figure 1:
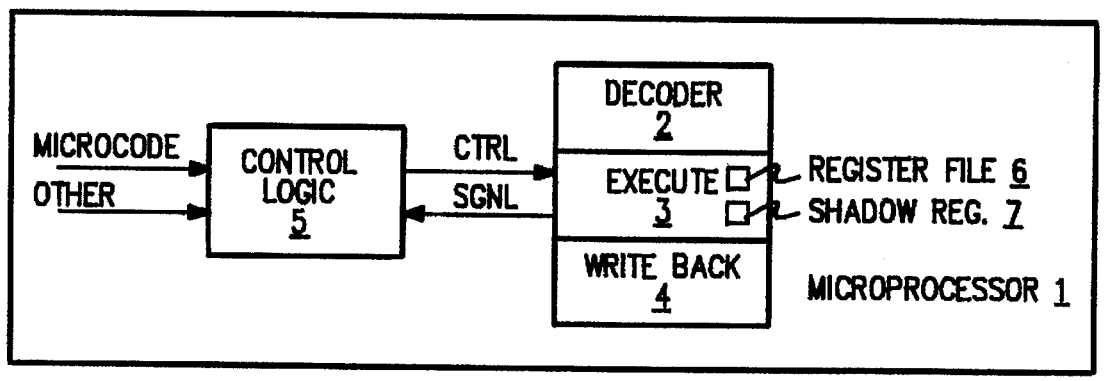
FIG. 1 is a block diagram showing portions of an integrated microprocessor system.

Referring now to FIG. 1, the preferred embodiment of the present invention is an integrated microprocessor system 1 having a pipelined architecture, wherein the pipeline includes, for example, a decoder stage 2, an execution unit 3 and a writeback stage 4. The present disclosure is directed to the execution unit 3, which provides a 32-bit data path for operands and instructions stored in general registers, including register file 6 and shadow register 7, and wherein arithmetic, logical and addressing computations are performed by the execution unit for programming instructions executed by the integrated microprocessor system 1.

The microprocessor system 1 includes a control logic unit 5 which is coupled to send control signals CTRL to the execution unit 3 and to receive data signals SGNL from the execution unit. The control logic unit 5 is also coupled to other components of the microprocessor system 1 and receives microcode and other input for making programmed control decisions.

The execution unit 3 is implemented to be substantially compatible with the Intel x86 instruction set, as set forth in the "Intel486™ MICROPROCESSOR FAMILY PROGRAMMER'S REFERENCE MANUAL," which is expressly incorporated herein by reference. The x86 instructions will be referenced herein in their common mnemonic form, such as ADD, SUB, MUL, DIV, etc.

Figure 2:
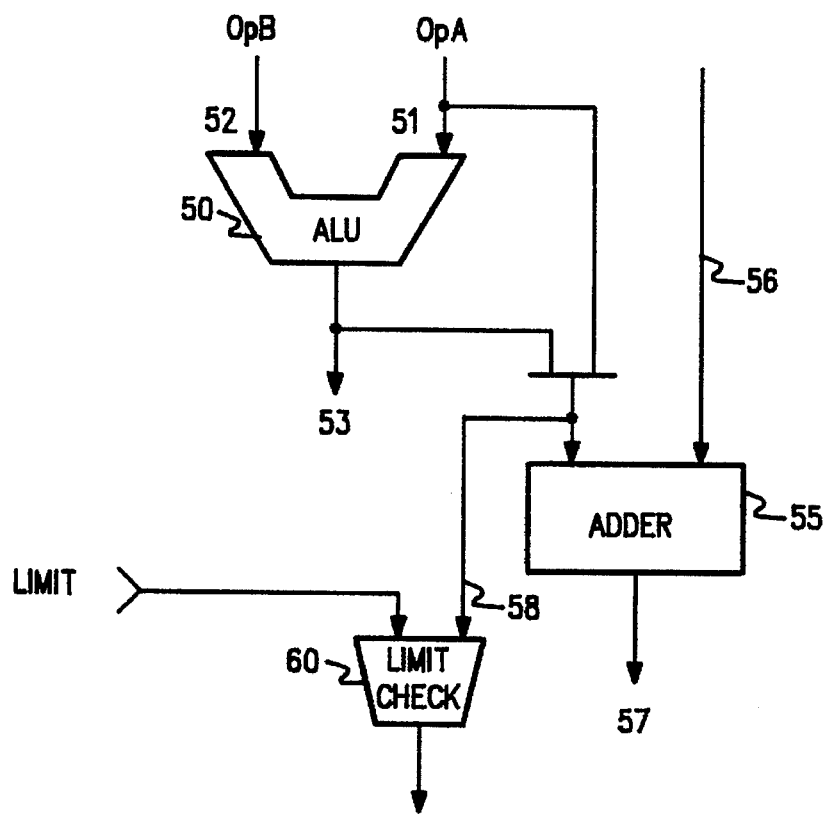
FIG. 2 is a functional block diagram of the execution unit portion of the integrated microprocessor system of FIG. 1.

A simplified functional diagram of the execution unit 3 is shown in FIG. 2. An arithmetic unit 50 has two inputs 51 and 52 for receiving operands OpA and OpB, respectively, from register file 6. The arithmetic unit 50 generates an arithmetic or logical result 53 in a single cycle for many x86 instructions.

The arithmetic unit 50 includes a first portion for performing addition, subtraction and logical operations, a second portion for performing multiply, divide and single-bit shift operations, and a third portion for performing multi-bit shift and rotate operations, as will be shown and described in more detail below.

An addressing unit 55 has one input selectively coupled to the output of the arithmetic unit 50 or to OpA. When an addressing instruction is received, the segment base component is provided to the addressing unit 55 on input 56, and the base, index, or displacement components, or immediate segment address operands, are provided to the arithmetic unit 50 on inputs 51 and 52. The addressing unit 55 then sums the address components to yield output 57 which is a linear address.

A limit check unit 60 is provided to make sure the offset 58, i.e., output 53 or OpA, is not addressing a location outside of the segment as determined by the control signal LIMIT.

Figure 3:
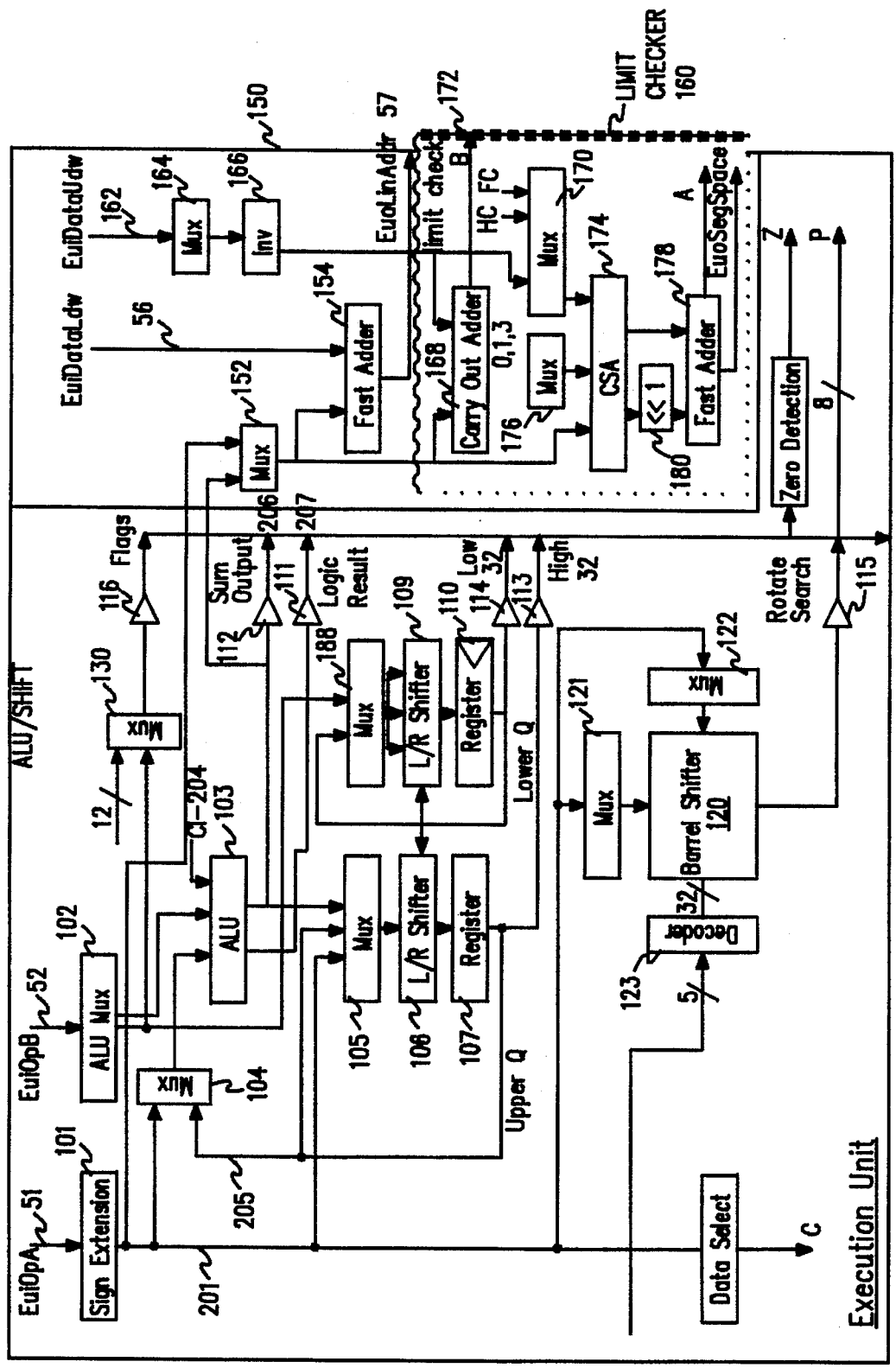
FIG. 3 is a more detailed block diagram of the execution unit of FIG. 2.
Figure 4:
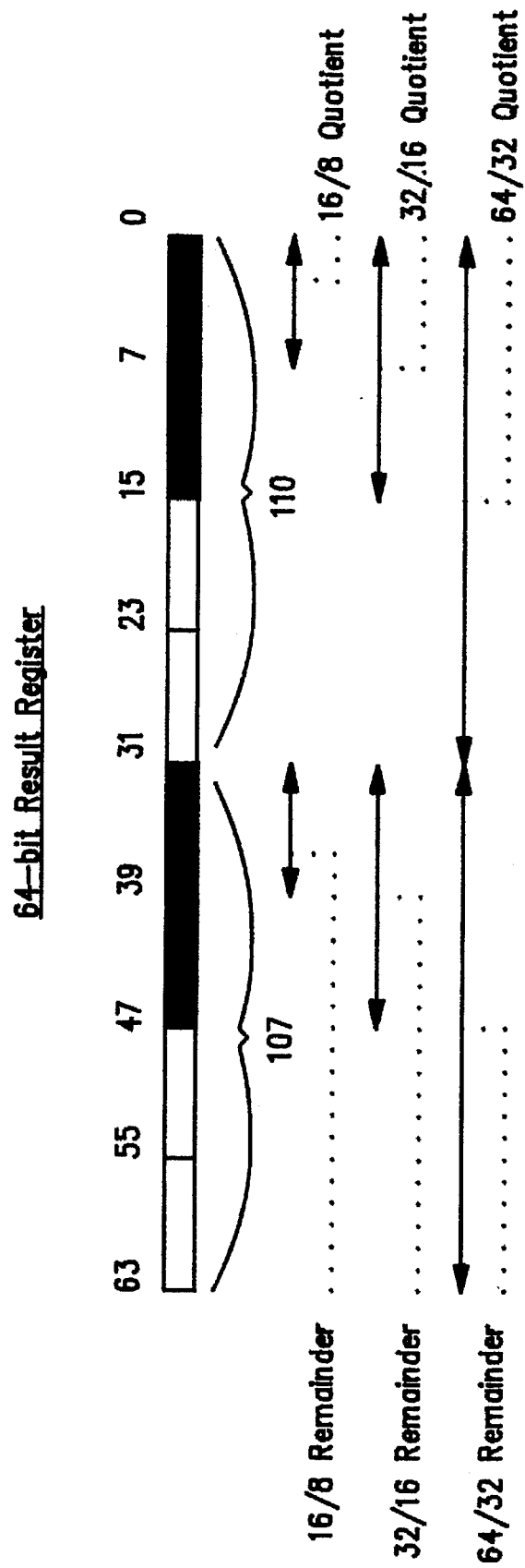
FIG. 4 is a schematic diagram of the result registers for a division operation.

Referring now to FIG. 3, the execution unit 3 is illustrated in greater detail. The preferred embodiment of the execution unit 3 is completely described by the hardware description language attached hereto as Appendix A, and which is expressly incorporated herein by reference. It should be apparent to one versed in the art that each component of the execution unit described below is controlled or selected by one or more control signals provided by the control logic unit 5. However, a detailed description of these control signals in not necessary for a complete understanding of the invention.

Operand A is received into a sign extension unit 101. Sign extension unit 101 is a 3:1 multiplexor that selects a byte and sign extends it into 32 bits, or selectes a word and sign extends it into 32 bits, or selects a dword, and then outputs the 32 bit result $a_{in}$ onto data line 201. The term "sign extend" means copying the sign bit into the 24 highest order bits for a byte or into the 16 highest order bits for a word.

Operand B is received into a sign extension unit 102. Sign extension unit 102 includes a 5:1 multiplexor that selects a signed byte and sign extends it into 32 bits, or a signed word and sign extends it into 32 bits, or an unsigned byte and sign extends it into 32 bits, or an unsigned word and sign extends it into 32 bits, or a dword. The output 202 is a 32 bit result bin. Sign extension unit 102 also includes a 2:1 multiplexor that selects OpB or its complement.

An adder 103 receives and operates upon data lines 202 and 203 and carry input CI 204. Data line 203 is from the output of a 2:1 multiplexor 104, which selects either aim data line 201 or UpperQ data line 205.

Adder 103 performs logical operations on data lines 202 and 203 to generate logic output 207, which is available to the user through output gate 111. The adder 103 also performs addition on data lines 202, 203 and 204 to generate sum output 206, which is available to the user through output gate 112.

Two 32 bit registers are provided for performing multiply, divide and single-bit shift operations. For the upper 32 bits, a 3:1 multiplexor 105 selects from $a_{in}$ data line 201, UpperQ data line 205, or SUM data line 207. The selected value may be shifted either left or right by one bit by left/right shifter 106 and then stored in register 107. For the lower 32 bits, a 2:1 multiplexor 108 selects from $b_{in}$ data line 202 or from LowerQ data line 208. The selected value may be shifted either left or right by one bit by left/right shifter 109 and then stored in register 110. The least significant bit (LSB) of left/right shifter 106 is coupled to the most significant bit (MSB) of left/right shifter 109 to permit up to 64 single bit position shifts.

The UpperQ register 107 provides an output data line 205 which is fed back to multiplexor 104 or multiplexor 105, as described above, or made available to the user through output gate 113. The LowerQ register 110 provides an output data line 208 which is fed back to multiplexor 108 as described above, or available to the user through output gate 114.

A barrel shifter 120 comprising a 32 by 32 transistor array is provided for performing multi-bit shift and rotate operations. A pair of 32 bit 2:1 multiplexors 121, 122 couple the $a_{in}$ data line 201 to the barrel shifter 120. A 5 bit decoder 123 provides 32 output signals, only one of which is true, to the barrel shifter 120, thus selecting one row of the barrel shifter. The output 209 of the barrel shifter 120 is available to the user through output gate 115.

A multiplexor 130 selectively outputs status flags from the execution unit 3 through output gate 116, as shown in Table I:

TABLE I

| Flag | Function |
| --- | --- |
| CF | Carry flag: Carry or Borrow from most-significant bit |
| PF | Parity Flag: Exclusive NOT of lower 8 bits of result |
| AF | Auxiliary Flaq: Carry of Borrow from bit 8 |
| ZF | Zero Flag: Zero result set ZF to 1; else ZF is cleared |
| SF | Sign Flag: set to most-significant bit of result |
| OF | Overflow Flag: set to 1 is two's complement overflow occurs; else cleared |

The addressing unit includes a 4:1 multiplexor 152 that selects the $a_{in}$ data line 201 if it is a dword, or zero extends the $a_{in}$ data line 201 if it is a word, or the SUM output 206 if a dword, or zero extends the SUM output if a word. The term "zero extend" means copying a zero into the 24 highest order bits for a byte or into the 16 highest order bits for a word.

An adder 154 receives the output from multiplexor 152 as well as the segment base value on data line 56 and adds the two values together, thereby generating a linear address 57.

A limit check unit 160 is also provided in execution unit 3. The address includes a 20 bit limit value 162 which is stored in the shadow register 7. This limit value is provided to multiplexor 164, where it is scaled to 32 bits, depending on the value of the granularity bit, then inverted through 32 bit inverter 166. The output of inverter 166 is coupled to an adder 168, in which only the carry out function is used, and to a multiplexor 170. The output of multiplexor 152 is also coupled to adder 168. The output B of adder 168 indicates that the offset is below the scaled limit value.

The multiplexor 170 is provided with constants HC (half ceiling) and FC (full ceiling), which provide the maximum value for addressing computations and cause selection of either 16 bit addresses (HC) or 32 bits addresses (FC). The output of multiplexor 170, which is the upper limit for address computations, is fed to adder 174, which is a carry save adder (CSA). Additional inputs to CSA 174 are from multiplexor 152 and multiplexor 176. Additional constant inputs 0, 1 and 3 are provided to the multiplexor 176 to define the instruction length, i.e., 0=byte, 1=word, and 3=dword.

The output of CSA 174 is fed to the input of adder 178 and to a single bit left shift unit 180, which effectively multiplies the value of the carry bits by 2. The output of shift unit 180 is fed to the adder 178. The output SegSpace of adder 178 is used for a limit calculcation by a prefetch unit (not shown) and the output A of adder 178 indicates that the offset in above the scaled limit value.

The operation of execution unit 3 for arithmetic and logical instructions will now be described in more detail.

Instructions for addition, subtraction, and logical operations are carried out in a conventional manner by utilizing the resources of adder 103.

Instructions for multiplication and division are carried out by using the adder 103, the upper shifter comprising multiplexor 105, shifter 106 and register 107, and the lower shifter comprising multiplexor 108, shifter 109 and register 110. Generally, most multiplication and division instructions are performed according to conventional algorithms, i.e., shift and add for multiplication, and subtract and shift for division operations.

For a division operation, if the value of $a_{in}$ is greater than the value stored in registers 107, 110, then 0 is entered and the shifter is selected, else 1 is entered and the adder 103 is selected. For a multiplication operation, if OpA equals 1, then the adder 103 is selected, else the shifter is selected.

A division example of 50 by 7 yields a quotient of 7 with a remainder of 1, as shown in Table II (truncated to 8 bits):

TABLE II

| Cycle | Register 107 + 110 | Shifter 106 + 109 | Adder 103 |
|---|---|---|---|
| 1 | 0011 0010 | 0110 0100 | 1111 |
| 2 | 0110 0100 | 1100 1001 | 0101 |
| 3 | 0101 1001 | 1011 0011 | 0100 |
| 4 | 0100 0011 | 1000 0111 | 0001 |
| 5 | 0001 0111 | xxxx xxxx | xxxx |

Figure 5:
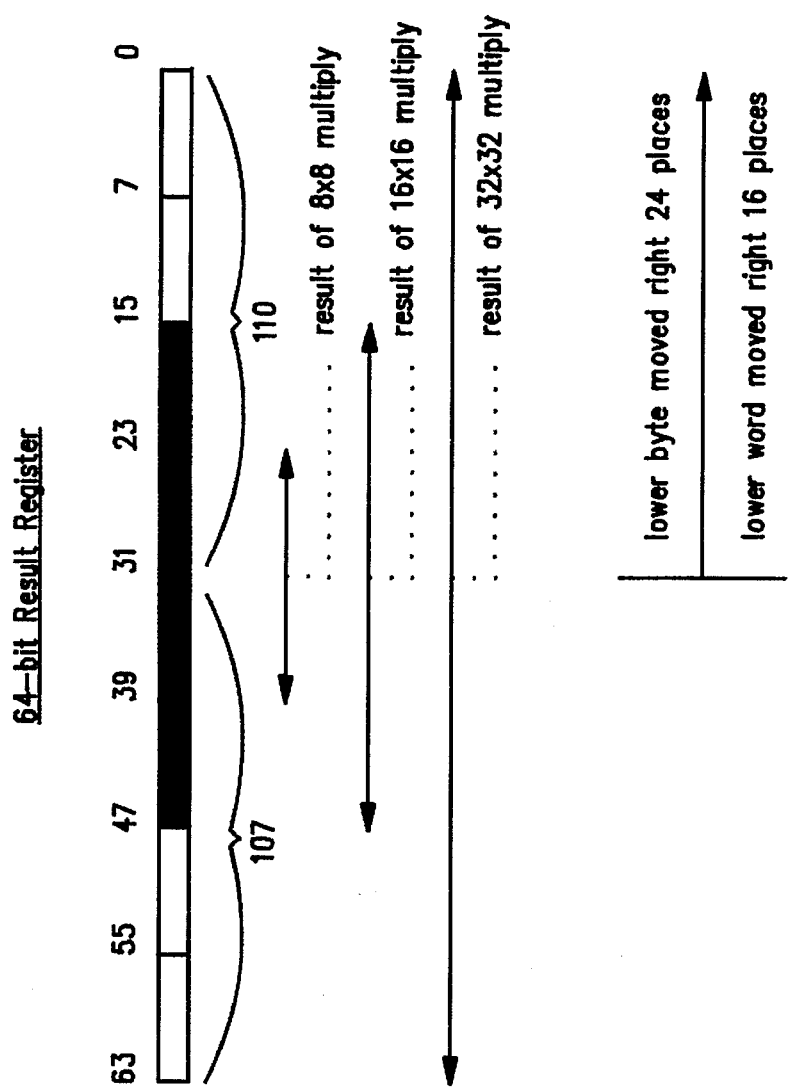
FIG. 5 is a schematic diagram of the result registers for a multiplication operation.

Register 110 is used to provide the quotient while register 107 is used to provide the remainder, as illustrated in FIG. 5. Thus, for byte operations, the lower 8 bits of register 110 contain the quotient while the lower 8 bits of register 107 contain the remainder. For word operations, the lower 16 bits of register 110 contain the quotient while the lower 16 bits of register 107 contain the remainder. For dword operations, all 32 bits of register 110 contain the quotient while all 32 bits of register 107 contain the remainder. Further discussion of the IDIV instruction can be found in commonly assigned, copending U.S. application Ser. No. 08/451,571, entitled "METHOD FOR PERFORMING SIGNED DIVISION" by H. John Tam and filed on May 26, 1995.

A multiplication example of 10 by 5 yields a product of 50, as shown in Table III (truncated to 8 bits):

TABLE III

| Cycle | Register 107 + 110 | Shifter 106 + 109 | Adder 103 |
|---|---|---|---|
| 1 | 0000 0000 | 0000 0000 | 1111 |
| 2 | 1010 0000 | 0101 0000 | 0101 |
| 3 | 0101 0000 | 0010 1000 | 0100 |

TABLE III-continued

| Cycle | Register 107 + 110 | Shifter 106 + 109 | Adder 103 |
|---|---|---|---|
| 4 | 1100 1000 | 0110 0100 | 0001 |
| 5 | 0110 0100 | 0011 0010 | 1101 |
| 6 | 0011 0010 | xxxx xxxx | xxxx |

The product of a multiplication operation is contained in registers 110 and 107 as illustrated in FIG. 5. Thus, for byte operations, a 16-bit result is contained in the upper 8 bits of register 110 and the lower 8 bits of register 107. For word operations, a 32-bit result is contained in the upper 16 bits of register 110 and the lower 16 bits of register 107. For dword operations, a 64-bit result is contained all 32 bits of register 110 and all 32 bits of register 107.

The barrel shifter 120 and associated multiplexors 121 and 122 may be used to carry out multi-bit shift and rotate operations, as is more fully described in the following commonly assigned, copending applications: U.S. application Ser. No. 08/451,444 entitled "BARREL SHIFTER" by Thomas W. S. Thomson and H. John Tam as filed on May 26, 1995; (2) U.S. application Ser. No. 08/451,204 entitled "BIT SEARCHING THROUGH 8, 16, OR 32-BIT OPERANDS USING A 32-BIT DATA PATH" by Thomas W. S. Thomson as filed on May 26, 1995; and (3) U.S. application Ser. No. 08/452,162 entitled "METHOD FOR PERFORMING ROTATE THROUGH CARRY USING A 32-BIT BARREL SHIFTER AND COUNTER" by H. John Tam as filed on May 26, 1995.

Double precision shift operations are also fully supported by the execution unit 3, as more fully described in commonly assigned, copending U.S. application Ser. No. 08/451,195 entitled "DOUBLE PRECISION (64-BIT) SHIFT OPERATIONS USING A 32-BIT DATA PATH" by Thomas W. S. Thomson and filed on May 26, 1995.

Addressing computations for x86 segmented address space are optimized in execution unit 3 for the predominant cases, i.e., where the address consists only of two components, namely a scaled index and a displacement, or a base and a displacement. The execution unit is capable of performing the entire address computation in a single cycle, i.e., it can perform calculate the offset, the linear address and the limit in a single cycle.

An address cycle is illustrated schematically in FIG. 7. A 32-bit segment base address is provided to input 56 and defines the memory segment space in which an operand resides. A 32-bit or 16-bit segment offset value is added to the segment base to form the linear address. The offset value is constructed from up to two general registers, namely a base register or an index register, and a literal displacement value, which is an 8-bit, 16-bit, or 32-bit value taken from the addressing instruction format. The index register can be scaled by a factor of 2, 4, or 8 before use, thereby allowing the index register to count elements rather than bytes when indexing through an array.

The invention embodiments described herein have been implemented in an integrated circuit which includes a number of additional functions and features which are described in the following co-pending, commonly assigned patent applications, the disclosure of each of which is incorporated herein by reference: U.S. patent application Ser. No. 08/451,319 entitled "DISPLAY CONTROLLER CAPABLE OF ACCESSING AN EXTERNAL MEMORY FOR GRAY SCALE MODULATION DATA" (atty. docket no. NSC1-62700); U.S. patent application Ser. No. 08/451,965, entitled "SERIAL INTERFACE CAPABLE OF OPERATING IN TWO DIFFERENT SERIAL DATA TRANSFER MODES" (atty. docket no. NSC1-62800); U.S. patent application Ser. No. 08/453,076, entitled "HIGH PERFORMANCE MULTIFUNCTION DIRECT MEMORY ACCESS (DMA) CONTROLLER" (atty. docket no. NSC1-62900); U.S. patent application Ser. No. 08/452,001, entitled "OPEN DRAIN MULTI-SOURCE CLOCK GENERATOR HAVING MINIMUM PULSE WIDTH" (atty. docket no. NSC1-63000); U.S. patent application Ser. No. 08/451,503, entitled "INTEGRATED CIRCUIT WITH MULTIPLE FUNCTIONS SHARING MULTIPLE INTERNAL SIGNAL BUSES ACCORDING TO DISTRIBUTED BUS ACCESS AND CONTROL ARBITRATION" (atty. docket no. NSC1-63100); U.S. patent application Ser. No. 08/451,924, entitled "EXECUTION UNIT ARCHITECTURE TO SUPPORT x86 INSTRUCTION SET AND x86 SEGMENTED ADDRESSING" (atty. docket no. NSC1-63300); U.S. patent application Ser. No. 08/451,444, entitled "BARREL SHIFTER" (atty. docket no NSC1-63400); U.S. patent application Ser. No. 08/451,204, entitled "BIT SEARCHING THROUGH 8, 16, OR 32-BIT OPERANDS USING A 32-BIT DATA PATH" (atty. docket no. NSC1-63500); U.S. patent application Ser. No. 08/451,195, entitled "DOUBLE PRECISION (64-BIT) SHIFT OPERATIONS USING A 32-BIT DATA PATH" (atty. docket no. NSC1-63600); U.S. patent application Ser. No. 08/451,571, entitled "METHOD FOR PERFORMING SIGNED DIVISION" (atty. docket no. NSC1-63700); U.S. patent application Ser. No. 08/452,162, entitled "METHOD FOR PERFORMING ROTATE THROUGH CARRY USING A 32-BIT BARREL SHIFTER AND COUNTER" (atty. docket no. NSC1-63800); U.S. patent application Ser. No. 08/451,434, entitled "AREA AND TIME EFFICIENT FIELD EXTRACTION CIRCUIT" (atty. docket no NSC1-63900); U.S. patent application Ser. No. 08/451,535, entitled "NON-ARITHMETICAL CIRCULAR BUFFER CELL AVAILABILITY STATUS INDICATOR CIRCUIT" (atty. docket no. NSC1-64000); U.S. patent application Ser. No. 08/445,563, entitled "TAGGED PREFETCH AND INSTRUCTION DECODER FOR VARIABLE LENGTH INSTRUCTION SET AND METHOD OF OPERATION" (atty. docket no. NSC1-64100); U.S. patent application Ser. No. 08/450,153, now U.S. Pat. No. 5,546,353, entitled "PARTITIONED DECODER CIRCUIT FOR LOW POWER OPERATION" (atty. docket no. NSC1-64200); U.S. patent application Ser. No. 08/451,495, entitled "CIRCUIT FOR DESIGNATING INSTRUCTION POINTERS FOR USE BY A PROCESSOR DECODER" (atty. docket no. NSC1-64300); U.S. patent application Ser. No. 08/451,219, entitled "CIRCUIT FOR GENERATING A DEMAND-BASED GATED CLOCK" (atty. docket no. NSC1-64500); U.S. patent application Ser. No. 08/451,214, entitled "INCREMENTOR/DECREMENTOR" (atty. docket no. NSC1-64700); U.S. patent application Ser. No. 08/451,150, entitled "A PIPELINED MICROPROCESSOR THAT PIPELINES MEMORY REQUESTS TO AN EXTERNAL MEMORY" (atty. docket no. NSC1-64800); U.S. patent application Ser. No. 08/451,198, entitled "CODE BREAKPOINT DECODER" (atty. docket no. NSC1-64900); U.S. patent application Ser. No. 08/445,569, entitled "TOW TIER PREFETCH BUFFER STRUCTURE AND METHOD WITH BYPASS" (atty. docket no. NSC1-65000); U.S. patent application Ser. No. 08/445,564, entitled "INSTRUCTION LIMIT CHECK FOR MICROPROCESSOR" (atty. docket no. NSC1-65100); U.S. patent application Ser. No. 08/452,306, entitled "A PIPELINED MICROPROCESSOR THAT MAKES MEMORY REQUESTS TO A CACHE MEMORY AND AN EXTERNAL MEMORY CONTROLLER DURING THE SAME CLOCK CYCLE" (atty. docket no. NSC1-65200); U.S. patent application Ser. No. 08/452,080, entitled "APPARATUS AND METHOD FOR EFFICIENT COMPUTATION OF A 486™ MICROPROCESSOR CAMPATIBLE POP INSTRUCTION" (atty. docket no. NSC1-65700); U.S. patent application Ser. No. 08/450,154, entitled "APPARATUS AND METHOD FOR EFFICIENTLY DETERMINING ADDRESSES FOR MISALIGNED DATA STORED IN MEMORY" (atty. docket no. NSC1-65800); U.S. patent application Ser. No. 08/451,742, entitled "METHOD OF IMPLEMENTING FAST 486™ MICROPROCESSOR COMPATIBLE STRING OPERATION" (atty. docket no. NSC1-65900); U.S. patent application Ser. No. 08/452,659, entitled "A PIPELINED MICROPROCESSOR THAT PREVENTS THE CACHE FROM BEING READ WHEN THE CONTENTS OF THE CACHE ARE INVALID" (atty. docket no. NSC1-66000); U.S. patent application Ser. No. 08/451,507, entitled "DRAM CONTROLLER THAT REDUCES THE TIME REQUIRED TO PROCESS MEMORY REQUESTS" (atty. docket no. NSC1-66300); U.S. patent application Ser. No. 08/451,420, entitled "INTEGRATED PRIMARY BUS AND SECONDARY BUS CONTROLLER WITH REDUCED PIN COUNT" (atty. docket no. NSC1-66400); U.S. patent application Ser. No. 08/452,365, entitled "SUPPLY AND INTERFACE CONFIGURABLE INPUT/OUTPUT BUFFER" (atty. docket no. NSC1-66500); U.S. patent application Ser. No. 08/451,744, entitled "CLOCK GENERATION CIRCUIT FOR A DISPLAY CONTROLLER HAVING A FINE TUNEABLE FRAME RATE" (atty. docket no. NSC1-66600); U.S. patent application Ser. No. 08/451,206, entitled "CONFIGURABLE POWER MANAGEMENT SCHEME" (atty. docket no. NSC1-66700); U.S. patent application Ser. No. 08/452,350, entitled "BIRDIRECTIONAL PARALLEL SIGNAL INTERFACE" (atty. docket no. NSC1-67000); U.S. patent application Ser. No. 08/452,094, entitled "LIQUID CRYSTAL DISPLAY (LCD) PROTECTION CIRCUIT" (atty. docket no. NSC1-67100); U.S. patent application Ser. No. 08/450,156, entitled "DISPLAY CONTROLLER CAPABLE OF ACCESSING GRAPHICS DATA FROM A SHARED SYSTEM MEMORY" (atty. docket no. NSC1-67500); U.S. patent application Ser. No. 08/450,726, now U.S. Pat. No. 5,541,935, entitled "INTEGRATED CIRCUIT WITH TEST SIGNAL BUSES AND TEST CONTROL CIRCUITS" (atty. docket no. NSC1-67600); U.S. patent application Ser. No. 08/445,568, entitled "DECODE BLOCK TEST METHOD AND APPARATUS" (atty. docket no. NSC1-68000).

It should be understood that the invention is not intended to be limited by the specifics of the above-described embodiment, but rather defined by the accompanying claims.

What is claimed is:

1. A microprocessor execution unit having four data inputs, comprising:

a first sign extender unit having an input and an output, said input being coupled to the first data input;

a first multiplexor having two inputs and an output, one of said inputs coupled to the output of the first sign extender unit;

a second multiplexor having three inputs and an output, one of said inputs coupled to the output of the first sign extender unit;

a third multiplexor having an input and an output, said input being coupled to the output of the first sign extender unit;

a fourth multiplexor having an input and an output, said input being coupled to the output of the first sign extender unit;

a fifth multiplexor having an input and an output, said input being coupled to the second data input;

a sixth multiplexor having two inputs and an output, one of said inputs coupled to the output of the fifth multiplexor;

a seventh multiplexor (120) having two inputs and an output selectable by a seventh control signal, one of said inputs coupled to the output of the fifth multiplexor;

an arithmetic unit having an input and an output, said input being coupled to the output of the fifth multiplexor and said output being coupled to the input of the second multiplexor;

a first left/right shifter coupled to a second left/right shifter, said first left/right shifter having an input and an output, said input being coupled to the output of the second multiplexor, said second left/right shifter having the input and an output, said input being coupled to the output of the seventh multiplexor;

a first register having an input and an output, said input being coupled to the output of the first left/right shifter, said output being coupled to an input of the first multiplexor and to an input of the second multiplexor;

a second register having an input and an output, said input being coupled to the output of the second left/right shifter, said output being coupled to an input of the seventh multiplexor;

a decoder having an input and an output;

a barrel shifter having three inputs and one output, one of said inputs being coupled to the output of the decoder, another of said inputs being coupled to the output of the third multiplexor, and another of said inputs being coupled to the output of the fourth multiplexor;

a first three-state gate having an input and an output, said input being coupled to the output of the sixth multiplexor;

a second three-state gate having an input and an output, said input being coupled to the output of the arithmetic unit;

a third three-state gate having an input and an output, said input being coupled to the output of the arithmetic unit;

a fourth three-state gate having an input and an output, said input being coupled to the output of the second register;

a fifth three-state gate having an input and an output, said input being coupled to the output of the first register; and a sixth three-state gate having an input and an output, said input being coupled to the output of the barrel shifter.

* * * * *